United States Patent
Batchu et al.

(10) Patent No.: US 9,504,011 B1
(45) Date of Patent: Nov. 22, 2016

(54) METHODS FOR IMPROVED SINGLE RADIO LONG TERM EVOLUTION (SRLTE) MOBILE TERMINATION (MT) CALL SUCCESS RATE FOR MOBILE SWITCHING CENTER (MSC)-SUB PAGING SCENARIOS

(71) Applicant: QUALCOMM Incorporated, San Diego, CA (US)

(72) Inventors: Bhaskara Viswanadham Batchu, Hyderabad (IN); Prabhanjan Reddy Pingili, Hyderabad (IN); Chintan Shirish Shah, San Diego, CA (US); Sharad Shahi, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/715,668

(22) Filed: May 19, 2015

(51) Int. Cl.
*H04W 68/02* (2009.01)
*H04J 13/00* (2011.01)
*H04W 88/06* (2009.01)

(52) U.S. Cl.
CPC .......... *H04W 68/02* (2013.01); *H04J 13/0048* (2013.01); *H04W 88/06* (2013.01)

(58) Field of Classification Search
CPC .. H04W 68/02; H04W 88/06; H04J 13/0048
See application file for complete search history.

(56) References Cited

U.S. PATENT DOCUMENTS

| | | | |
|---|---|---|---|
| 8,811,421 B2 | 8/2014 | Su et al. | |
| 2013/0090137 A1* | 4/2013 | Krishnamoorthy | ... H04W 68/02 455/458 |
| 2013/0215834 A1* | 8/2013 | Deivasigamani | ... H04W 76/046 370/329 |
| 2013/0244656 A1 | 9/2013 | Heo et al. | |
| 2013/0331057 A1 | 12/2013 | Kodali et al. | |
| 2014/0003397 A1* | 1/2014 | Goyal | ............... H04W 72/0446 370/335 |
| 2014/0004849 A1 | 1/2014 | Su et al. | |
| 2015/0163827 A1* | 6/2015 | Ekici | ..................... H04W 68/02 370/338 |

\* cited by examiner

*Primary Examiner* — Barry Taylor
(74) *Attorney, Agent, or Firm* — The Marbury Law Group, PLLC

(57) ABSTRACT

Various embodiments provide methods, devices, and non-transitory processor-readable storage media for mitigating the risk of delayed connection or call failure during base station handover by preventing single radio long term evolution (SRLTE) communication devices from dropping Mobile Termination (MT) paging messages due to paging channel mismatches (e.g., mismatches between the Walsh codes used for different paging channels).

22 Claims, 7 Drawing Sheets

METHODS FOR IMPROVED SINGLE RADIO LONG TERM EVOLUTION (SRLTE) MOBILE TERMINATION (MT) CALL SUCCESS RATE FOR MOBILE SWITCHING CENTER (MSC)-SUB PAGING SCENARIOS

BACKGROUND

Mobile communication devices—such as smart phones—may be single radio long term evolution (SRLTE) communication devices in which a single radio frequency resource (RF resource) supports both data and voice calls in a mobile telephony network (e.g., Code Division Multiple Access (CDMA) networks or Global System for Mobile Communications (GSM) Enhanced Data Rate for GSM Evolution (EDGE) Radio Access Network (GERAN) networks).

When an incoming call is available for an SRLTE communication device, the mobile telephony network enters a Mobile Switching Center (MSC)-Sub paging scenario in which the network attempts to notify the SRLTE communication device of the incoming call by sending Mobile Termination (MT) paging messages to the SRLTE communication device on all configured paging channels for the serving base station (BS) for the SRLTE communication device registered with the network, as well as through all paging channels for the base stations neighboring the serving base station. When the SRLTE communication device receives the MT paging message via one of the paging channels, the SRLTE communication device responds with an MT page response message indicating that the MT call can be established.

However, the process of responding to a received MT paging message is not instantaneous. Delays result from processing the MT paging message and delays in reconfiguring the RF resource of the SRLTE communication device. For example, when the SRLTE communication device is conducting a data call at the time a MT paging message is received, an Extended Service Request (ESR) procedure for the data service may need to be completed before an MT page response can be sent by the SRLTE communication device.

During delays between receiving MT paging messages and being able to send MT page response messages, the SRLTE communication device may have handed off from the serving base station to another new base station due to movement of the device and/or changing network conditions. The paging channel in the new base station may be different from the paging channel in the previous serving base station on which the MT paging message was received. In current systems, prior to sending an MT page response, the SRLTE communication device will check the current paging channel being used against the paging channel on which the MT paging message was received. In response to determining that there is a mismatch between the current paging channel and the paging channel on which the MT paging message was received, the SRLTE communication device will drop the MT paging message. Dropping the MT paging message causes the SRLTE communication device to not send a MT page response and leads to a delay in establishing the call or a preemptive drop of the call.

SUMMARY

Various embodiments provide methods, devices, and non-transitory processor-readable storage media for mitigating the risk of delayed connection or call failure during base station (BS) handover by preventing single radio long term evolution (SRLTE) communication devices from dropping Mobile Termination (MT) paging messages due to paging channel mismatches (e.g., mismatches between the Walsh codes used for different paging channels).

Methods for managing MT paging messages in a SRLTE communication device according to various embodiments include receiving an MT paging message, determining whether a base station handover has occurred since the MT paging message was received, determining a current paging channel that the SRLTE communication device selected from a current serving base station in response to determining that a base station handover has occurred since the MT paging message was received, determining whether there is a mismatch between the current paging channel and an original paging channel that the SRLTE communication device had selected from an original serving base station when the MT paging message was received, and sending a MT page response message to the current serving base station on the current paging channel in response to determining that there is a mismatch between the current paging channel and the original paging channel.

In some embodiments, the methods may further include sending the MT page response message to the original serving base station on the original paging channel in response to determining that a base station handover has not occurred since the MT paging message was received. In some embodiments, the methods may further include sending the MT page response message to the current serving base station on the original paging channel in response to determining that there is not a mismatch between the current paging channel and the original paging channel. In some embodiments, the methods may further include reconfiguring a single radio frequency (RF) resource to respond to the MT paging message, and determining the current serving base station after reconfiguring the single RF resource.

In some embodiments, the methods may further include determining the original paging channel that the SRLTE communication device had selected from the original serving base station when the MT paging message was received. In some embodiments, the methods may further include determining whether a Max Access Probe Exit (MAPE) threshold is exceeded after sending the MT page response message on the current paging channel, and stopping sending of the MT page response message on the current paging channel without adding the current serving base station or current paging channel to a temporary avoidance/forbidden list in response to determining that the MAPE threshold is exceeded.

In some embodiments, the methods may further include determining whether a MT call is established, stopping sending of the MT page response message on the current paging channel in response to determining that a MT call is established, and re-sending the MT page response message to the current serving base station on the current paging channel in response to determining that a MT call is not established.

In some embodiments determining whether there is a mismatch between the current paging channel and an original paging channel that the SRLTE communication device had selected from an original serving base station when the MT paging message was received may include determining whether a first Walsh code of the current paging channel and a second Walsh code of the original paging channel are the same when the current paging channel and the original paging channel have a common carrier frequency.

In some embodiments stopping sending of the MT page response message on the current paging channel without adding the current serving base station or current paging channel to a temporary avoidance/forbidden list in response to determining that the MAPE threshold is exceeded may include stopping sending of the MT page response message on the current paging channel without adding the current serving base station or current paging channel to a temporary avoidance/forbidden list in response to determining that the MAPE threshold is exceeded and that a base station handover occurred since the MT paging message was received. In some embodiments, the methods may further include adding the current serving base station or current paging channel to a temporary avoidance/forbidden list in response to determining that the MAPE threshold is exceeded and that a base station handover has not occurred since the MT paging message was received, and stopping sending of the MT page response message on the current paging channel in response to adding the current serving base station or current paging channel to a temporary avoidance/forbidden list.

Various embodiments may include a communication device, such as a SRLTE communication device, configured with processor-executable instructions to perform operations of the methods described above.

Various embodiments may include a communication device, such as a SRLTE communication device, having means for performing functions of the operations of the methods described above.

Various embodiments may include non-transitory processor-readable media on which are stored processor-executable instructions configured to cause a processor of a communication device, such as a SRLTE communication device, to perform operations of the methods described above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

DETAILED DESCRIPTION

Figure 1:
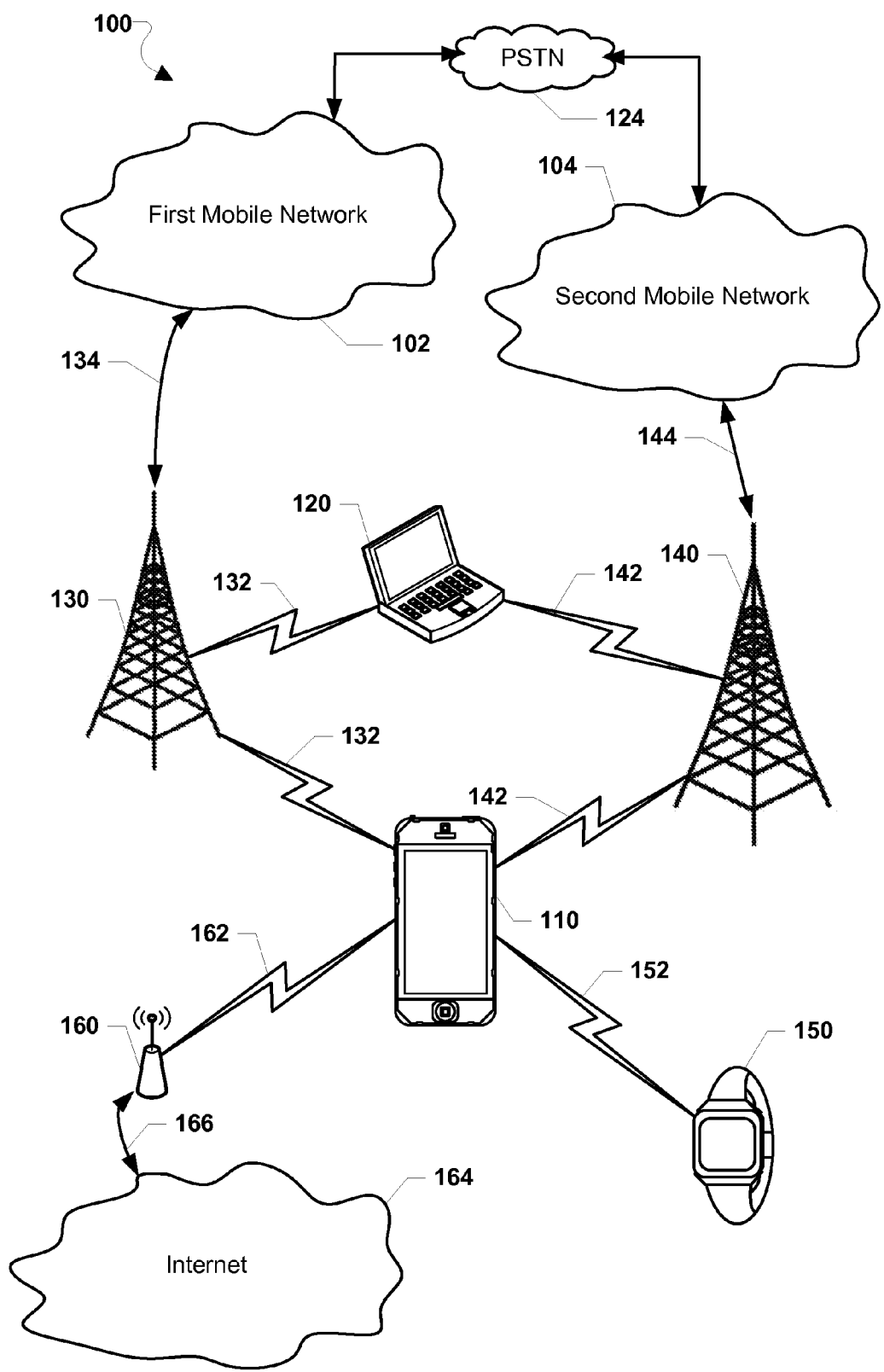
FIG. 1 is a communication system block diagram of a network suitable for use with the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the disclosure or the claims.

SRLTE communication devices can select a particular paging channel out of multiple paging channels supported by a BS (base station) based on its unique International Mobile Subscriber Identity (IMSI) value. The SRLTE communication device learns about the paging channels supported on a particular BS via a System Parameters overhead message. If there are more than one paging SRLTE specified in the System Parameters Message (i.e., PAGE_CHAN>1), the SRLTE communication device will use a hash algorithm (with HASH_KEY based on the device's unique IMSI value) to select a particular a Paging Channel number in the range [1, PAGE_CHAN] in order to listen to SRLTE communication device directed messages from BS. In other words, the SRLTE communication device may hash onto a paging channel by using a hash key based on the SRLTE communication device's unique IMSI value in a hash algorithm to select a particular paging channel number from the range of supported paging channels to listen for SRLTE communication device directed messages from the base station. Since this selection of a particular paging channel involves the use of a hash function, the selected paging channel may be referred to herein as the channel onto which the SRLTE communication device is "hashed."

Various embodiments mitigate the risk of delayed connection or call failure during base station (BS) handover by preventing SRLTE communication devices from dropping Mobile Termination (MT) paging messages due to paging channel mismatches (e.g., mismatches between the Walsh codes used for different paging channels). In various embodiments, when the SRLTE communication device proceeds to handle/respond to an MT paging message, the SRLTE communication device may determine whether a base station handover has occurred since the MT paging message was received. In response to determining that a base station handover has occurred since the MT paging message was received, the SRLTE communication device may determine whether the current paging channel (i.e., the paging channel that the SRLTE communication device is currently hashed onto) with the current (i.e., new) serving base station is different from the paging channel of the original (i.e., previous) base station on which the MT paging message was received. For example, in various networks, the same carrier frequency may be used by all paging channels, and different paging channels may be created by modulating the carrier frequency with different Walsh codes to create different channels. In such networks, the SRLTE communication device may determine whether the current paging channel (i.e., the paging channel that the SRLTE communication device is currently hashed onto) with the current (i.e., new) serving base station is different from the paging channel of the original (i.e., previous) base station on which the MT paging message was received by determining whether the Walsh codes used to modulate the common carrier frequency of the paging channels are different, and thus the paging channels are effectively different.

In response to determining that there is a paging channel mismatch between the current paging channel (i.e., the paging channel that the SRLTE communication device is currently hashed onto) with the current (i.e., new) serving base station and the paging channel of the original (i.e., previous) base station on which the MT paging message was received (e.g., the Walsh codes are different), in various embodiments the SRLTE communication device may send a MT page response message to the current serving base station via the current (i.e., new) paging channel (i.e., the paging channel that the SRLTE communication device is currently hashed onto with the current serving base station). This MT page response message may be sent via a new paging channel with the new Walsh code that the SRLTE communication device is currently hashed onto with the new serving base station. The current serving base station will likely have the MT page context, because in the Mobile Switching Center (MSC)-Sub paging scenario the neighbor base stations may also send MT paging messages on all their respective paging channels. Thus, the new serving base station may expect the MT page response message from the SRLTE communication device and may handle the response message appropriately. In this manner, the SRLTE communication device may successfully respond to the MT paging message even though a base station handover occurred, and the MT call may be established via the current (i.e., new) serving base station.

In various embodiments, in a scenario in which the current serving base station does not have an MT page context established, the SRLTE communication device may repeatedly send the MT page response message via the current paging channel (i.e., the paging channel that the SRLTE communication device is currently hashed onto) with the current serving base station without the MT call being established. The call may not be established because the base station was not notified by the MSC to attempt to establish the MT call, not because the base station did not receive the MT page response message. Thus, the base station will take no action. This situation may be caused by the SRLTE communication device traveling to a cell served by a base station that was not a neighbor base station of the original serving base station when the MSC-Sub paging scenario occurred. Because the call is not established in response to repeated MT page response messages sent by the SRLTE communication device, a Max Access Probe Exit (MAPE) threshold for sending MT page response messages may be exceeded.

In current systems, when the MAPE threshold is exceeded, the SRLTE communication device places the paging channel and/or base station on the temporary avoidance/forbidden list. In current systems, this "blacklisting" of the paging channel and/or base station occurs because the failure to establish the call is assumed to be due to low quality of service with the serving base station.

However, in various embodiments, the failure to establish the MT call may not be due to a problem with the quality of service, but because the current (i.e., new) serving base station was not a paging base station when the MSC-Sub paging scenario occurred. Thus, in various embodiments, in response to determining that a base station handover occurred since the MT paging message was received and a MAPE threshold for sending MT page response messages is exceeded, the SRLTE communication device may stop sending the MT page response message without adding the current paging channel or current serving base station to a temporary avoidance/forbidden list.

The term "communication device," is used herein to refer to any one or all of cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, and similar personal electronic devices that include a programmable processor and memory and circuitry for establishing wireless communication pathways and transmitting/receiving data via wireless communication pathways. The various aspects may be useful in single radio long-term evolution (SRLTE) communication devices, such as smart phones, and so such devices are referred to in the descriptions of various embodiments. However, the embodiments may be useful in any electronic devices in which a single radio frequency resource (RF resource) supports both data and voice calls in a mobile telephony network, such as Code Division Multiple Access (CDMA) networks or Global System for Mobile Communications (GSM) Enhanced Data Rate for GSM Evolution (EDGE) Radio Access Network (GERAN) networks.

Various embodiments may be implemented within a variety of communication systems 100, an example of which is illustrated in FIG. 1. A first mobile network 102 and a second mobile network 104 typically each include a plurality of cellular base stations (e.g., a first base station 130 and a second base station 140). The networks 102, 104 may also be referred to by those of skill in the art as access networks, radio access networks, base station subsystems (BSSs), UMTS Terrestrial Radio Access Networks (UTRANs), etc. The networks 102, 104 may use the same or different wireless interfaces and/or physical layers. In an embodiment, the base stations 130, 140 may be controlled by one or more base station controllers (BSCs). Alternate network configurations may also be used and the embodiments are not limited to the configuration illustrated.

A first SRLTE communication device 110 may be in communication with the first mobile network 102 through a cellular connection 132 to the first base station 130. The first SRLTE communication device 110 may also be in communication with the second mobile network 104 through a cellular connection 142 to the second base station 140. The first base station 130 may be in communication with the first mobile network 102 over a wired connection 134. The second base station 140 may be in communication with the second mobile network 104 over a wired connection 144.

A second SRLTE communication device 120 may similarly communicate with the first mobile network 102 through the cellular connection 132 to the first base station 130. The second SRLTE communication device 120 may communicate with the second mobile network 104 through the cellular connection 142 to the second base station 140.

The cellular connections 132 and 142 may be made through two-way wireless communication links, such as GSM (particularly, GERAN), Universal Mobile Telecommunications Systems (UMTS) (particularly, Long Term Evolution (LTE)), Frequency Division Multiple Access (FDMA), Time Division Multiple Access (TDMA), CDMA, Wi-Fi, Personal Communications (PCS), Third Generation (3G), Fourth Generation (4G), Fifth Generation (5G), or other mobile telephony communication technologies.

In various embodiments, the SRLTE communication devices 110, 120 may access networks 102, 104 after camping on cells managed by the base stations 130, 140. In some embodiments the SRLTE communication devices 110, 120 may engage in one active communication at a time, such as a single data call or single voice call.

In the system 100, the SRLTE communication devices 110, 120 may be multi-SIM communication devices that are capable of operating with a number of wireless networks enabled by information stored in a plurality of SIMs. Using dual-SIM functionality, the SRLTE communication devices 110, 120 may access the two networks 102, 104 by camping on cells managed by the base stations 130, 140.

While the SRLTE communication devices 110, 120 are shown connected to the mobile networks 102, 104, in some embodiments (not shown), the SRLTE communication devices 110, 120 may include one or more subscriptions to two or more mobile networks 102, 104 and may connect to those networks in a manner similar to operations described above.

In some embodiments, the first SRLTE communication device 110 may establish a wireless connection 152 with a peripheral device 150 used in connection with the first SRLTE communication device 110. For example, the first SRLTE communication device 110 may communicate over a Bluetooth® link with a Bluetooth-enabled personal computing device (e.g., a "smart watch"). In some embodiments, the first SRLTE communication 110 may establish a wireless connection 162 with a wireless access point 160, such as over a Wi-Fi connection. The wireless access point 160 may be configured to connect to the Internet 164 or another network over a wired connection 166.

While not illustrated, the second SRLTE communication device 120 may similarly be configured to connect with the peripheral device 150 and/or the wireless access point 160 over wireless links.

The networks 102, 104 may be interconnected by public switched telephone network (PSTN) 124, across which the networks 102, 104 may route various incoming and outgoing communications to the SRLTE communication devices 110, 120.

Figure 2:
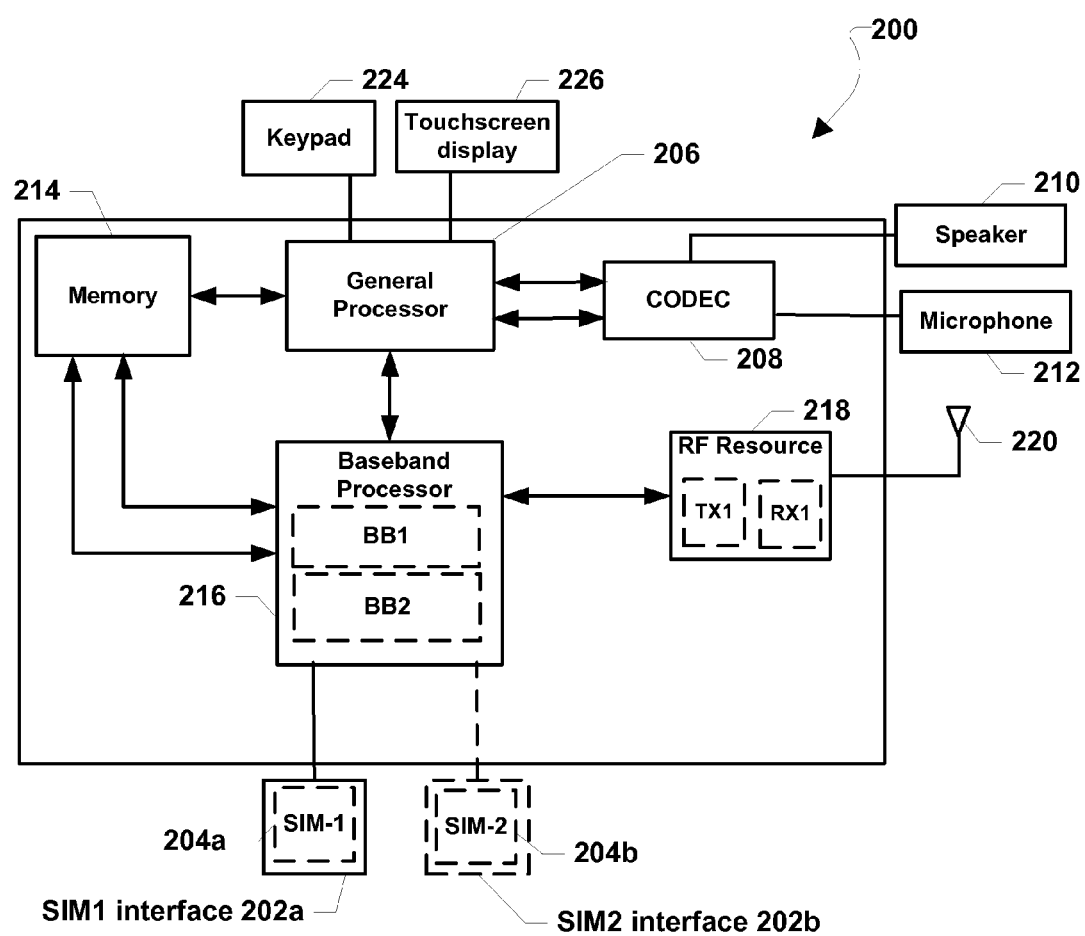
FIG. 2 is a block diagram illustrating a single radio long-term evolution (SRLTE) communication device according to various embodiments.

FIG. 2 is a functional block diagram of an example SRLTE communication device 200 that is suitable for implementing various embodiments. With reference to FIGS. 1-2, the SRLTE communication device 200 may be similar to one or more of the SRLTE communication devices 110, 120. The SRLTE communication device 200 may include a first SIM interface 202a, which may receive a first identity module SIM 204a that is associated with the first subscription. The wireless device 200 may also include a second SIM interface 202b, which may receive a second identity module SIM 204b that is associated with the second subscription.

A SIM in various embodiments may be a Universal Integrated Circuit Card (UICC) that is configured with SIM and/or USIM applications, enabling access to, for example, GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card. Each SIM card may have a CPU, ROM, RAM, EEPROM, and I/O circuits.

A SIM used in various embodiments may contain user account information, an international mobile subscriber identity (IMSI), a set of SIM application toolkit (SAT) commands, and storage space for phone book contacts. A SIM card may further store home identifiers (e.g., a System Identification Number (SID)/Network Identification Number (NID) pair, a Home PLMN (HPLMN) code, etc.) to indicate the SIM card network operator provider. An Integrated Circuit Card Identity (ICCID) SIM serial number is printed on the SIM card for identification. However, a SIM may be implemented within a portion of memory of the SRLTE communication device 200 (e.g., memory 214), and thus need not be a separate or removable circuit, chip or card.

The SRLTE communication device 200 may include at least one controller, such as a general processor 206, which may be coupled to a coder/decoder (CODEC) 208. The CODEC 208 may in turn be coupled to a speaker 210 and a microphone 212. The general processor 206 may also be coupled to the memory 214. The memory 214 may be a non-transitory computer readable storage medium that stores processor-executable instructions. For example, the instructions may include routing communication data relating to the first or second subscription though a corresponding baseband-RF resource chain.

The memory 214 may store an operating system (OS), as well as user application software and executable instructions. The memory 214 may also store application data, such as an array data structure.

The general purpose processor 206 and the memory 214 may each be coupled to at least one baseband modem processor 216. Each SIM 204a, 204b in the SRLTE communication device 200 may share a baseband-RF resource chain. A baseband-RF resource chain may include the baseband modem processor 216, which may perform baseband/modem functions for communicating with/controlling a RAT, and may include one or more amplifiers and radios, referred to generally herein as RF resources (e.g., RF resources 218). The RF resource 218 may be coupled to antenna 220, and may perform transmit/receive functions for the wireless services associated with each SIM 204a, 204b of the SRLTE communication device 200. The RF resource 218 may provide separate transmit and receive functionality, or may include a transceiver that combines transmitter and receiver functions.

In some embodiments, the general processor 206, the memory 214, the baseband processor(s) 216, and the RF resources 218a, 218b may be included in the SRLTE communication device 200 as a system-on-chip. In some embodiments, the first and second SIMs 204a, 204b and their corresponding interfaces 202a, 202b may be external to the system-on-chip. Further, various input and output devices may be coupled to components on the system-on-chip, such as interfaces or controllers. Example user input components suitable for use in the SRLTE communication device 200 may include, but are not limited to, a keypad 224, a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive a selection of a contact from a contact list or to receive a telephone number. As another example, the request to initiate the outgoing call may be in the form of a voice command received via the microphone 212. Interfaces may be provided between the various software modules and functions in the SRLTE communication device 200 to enable communication between them.

Figure 3:
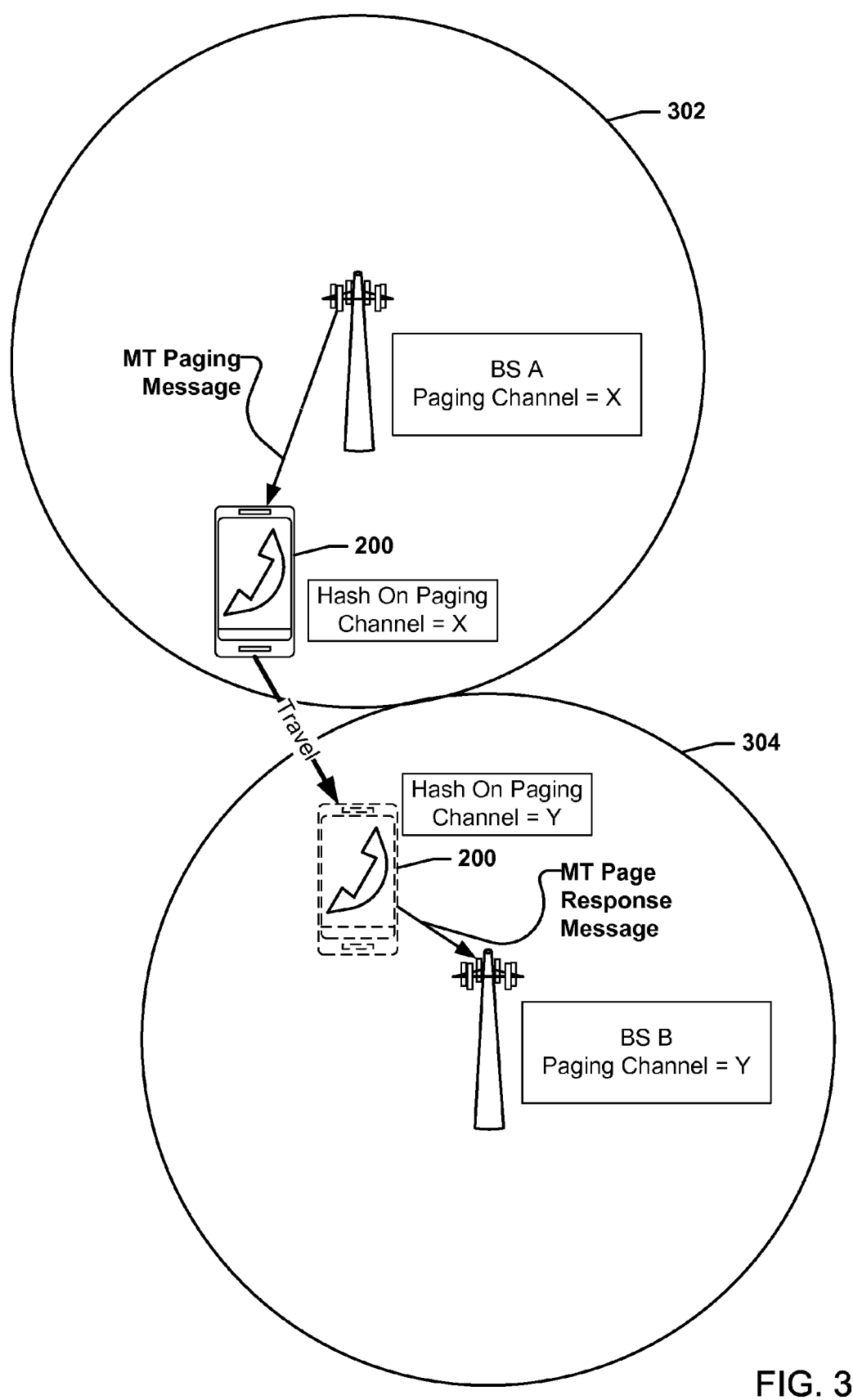
FIG. 3 is a block diagram of a Mobile Switching Center (MSC)-Sub paging scenario according to an embodiment.

FIG. 3 is a block diagram of a MSC-Sub paging scenario according to various embodiments in which the SRLTE communication device 200 travels from a first cell 302 to a second cell 304 before responding to a MT paging message. With reference to FIGS. 1-3, at a first time, the SRLTE communication device 200 may be located within the first cell 302 managed by a base station (BS) A. The base station A may be configured to operate with a paging channel X, and the SRLTE communication device 200 may camp on the base station A by selecting the paging channel X from the base station A to listen for MT paging messages addressed to the SRLTE communication device 200. For example, the SRLTE communication device 200 may determine the number of paging channels supported by the base station A (e.g., paging channel X) from an overhead message, such as a System Parameters overhead message. The SRLTE communication device 200 may select the paging channel X from the base station A by using a hash key based on the SRLTE communication device's 200 unique IMSI value in a hash algorithm, thereby hashing onto the paging channel X with the base station A to listen for MT paging messages addressed to the SRLTE communication device 200. The second cell 304 managed by the base station B may be a neighbor cell to the first cell 302, and the base station B may be configured to operate with a paging channel Y. The paging channels X and Y may use different Walsh codes. For example, a common paging channel signal may be modulated (e.g., spread) using a first Walsh code to generate the paging channel X transmitted by the base station A and a second different Walsh code to generate the paging channel Y transmitted by the base station B.

When a MT call is available for the SRLTE communication device 200, the MSC-Sub paging scenario may be initiated in the network and the MSC may direct the serving base station A for the SRLTE communication device 200, as well as any neighbor base stations (e.g., base station B), to send MT paging messages on all of their respective paging channels in an attempt to notify the SRLTE communication device 200 of the incoming MT call. In this manner, the serving base station A and any of its neighbor base stations (e.g., base station B) may become paging base stations and may establish a MT page context for the SRLTE communication device 200 to listen for MT page response messages from the SRLTE communication device 200.

While the SRLTE communication device 200 may receive the MT paging message in the first cell 302, there may be a delay in responding to the MT paging message at the SRLTE communication device 200. Delays may result from processing the MT paging message and from reconfiguring the RF resource 218 of the SRLTE communication device 200. For example, when the SRLTE communication device 200 is conducting a data call at the time that a MT paging message is received, an Extended Service Request (ESR) procedure for the data service may need to be completed before an MT page response message can be sent by the SRLTE communication device 200.

During the delay in responding to the MT paging message, the SRLTE communication device 200 may travel to the second cell 304 and may select the paging channel Y from the base station B. For example, the SRLTE communication device 200 may determine the number of paging channels supported by the base station B (e.g., paging channel Y) from an overhead message, such as a System Parameters overhead message. The SRLTE communication device 200 may select the paging channel Y from the base station B by using a hash key based on the SRLTE communication device's 200 unique IMSI value in a hash algorithm, thereby hashing onto the paging channel Y with the base station B. In this manner, the base station A may be considered the original serving base station for the SRLTE communication device 200 and the paging channel X may be the original paging channel for the SRLTE communication device 200, while the base station B and the paging channel Y may be considered the current serving base station and current paging channel, respectively, for the SRLTE communication device 200. In various embodiments, the SRLTE communication device 200 may determine that there is a paging channel mismatch between the paging channel X and the paging channel Y (e.g., the Walsh codes for paging channel X and Y are different), but may send a MT page response message on the paging channel Y to the base station B despite the mismatch. The base station B may receive the MT page response of the paging channel Y and may expect the MT page response from the SRLTE communication device 200 because the base station B has the MT page context for the SRLTE communication device 200. The MT call may then be successfully established with the SRLTE communication device 200 via the base station B in the cell 304.

Figure 4:
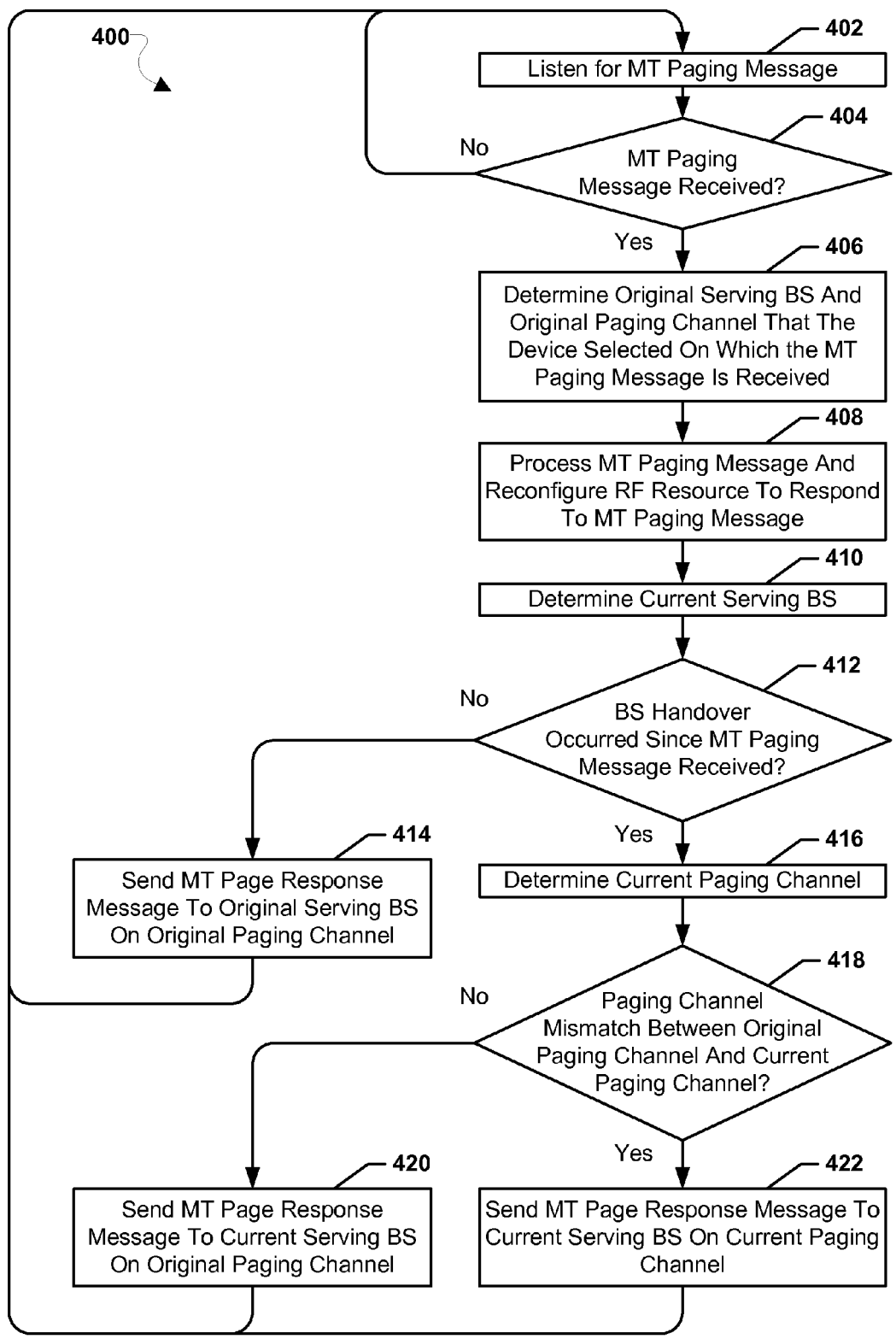
FIG. 4 is a process flow diagram illustrating an embodiment method for preventing a SRLTE communication device from dropping Mobile Termination paging messages due to paging channel mismatches.

FIG. 4 illustrates a method 400 for preventing a SRLTE communication device from dropping MT paging messages due to paging channel mismatches according to various embodiments. With reference to FIGS. 1-4, the method 400 may be implemented with a processor (e.g., the general processor 206, the baseband modem processor 216, a separate controller, and/or the like) of a SRLTE communication device (e.g., the SRLTE communication device 200). In block 402, the processor may begin performing operations of the method 400 by listening for one or more MT paging messages. In various embodiments, the SRLTE communication device may have selected a paging channel of a base station (e.g., by hashing onto the paging channel of the base station) and may listen for paging messages, such as a MT paging message on the paging channel.

In determination block 404, the processor may determine whether an MT paging message is received. In response to determining that a MT paging message is not received (i.e., determination block 404="No"), the processor may continue to listen for MT paging messages in block 402.

In response to determining that a MT paging message is received (i.e., determination block 404="Yes"), the processor may determine the original serving base station and original paging channel that the SRLTE communication device selected (hashed onto) and on which the MT paging message is received in block 406. As described above, the original serving base station and original paging channel may be the paging channel of the serving base station when the MT paging message is received. As an example, the SRLTE communication device may have selected the original paging channel from the serving base station by using a hash key based on the SRLTE communication device's unique IMSI value in a hash algorithm, thereby hashing onto the original paging channel.

In block 408, the processor may process the MT paging message and reconfigure the RF resource to respond to the MT paging message. For example, when the SRLTE communication device is conducting a data call at the time a MT paging message is received, processing the MT paging message and reconfiguring the RF resource to respond to the MT paging message may include performing an ESR procedure for the data service.

In block 410, the processor may determine the current serving base station. In various embodiments, determining the current serving base station may be performed upon completion of the operations of block 408 to process the MT paging message and reconfigure the RF resource to respond to the MT paging message. In this manner, the processor may identify the current serving base station after any delay caused by processing the MT paging message and reconfiguring the RF resource to respond to the MT paging message has occurred.

In determination block 412, the processor may determine whether a base station handover has occurred since the MT paging message was received (in block 404). The processor may determine that a base station handover has occurred since the MT paging message was received by comparing the base station identifier of the original serving base station to the base station identifier of the determined current serving base station. In response to determining that a base station handover has not occurred (i.e., determination block 412="No"), the processor may send the MT page response message to the original serving base station on the original paging channel in block 414. The processor may then continue to listen for MT paging messages on the original paging channel in block 402.

In response to determining that a base station handover has occurred (i.e., determination block 412="Yes"), the processor may determine the current paging channel selected by the SRLTE communication device in block 416. As an example, the processor may determine the current paging channel selected by the SRLTE communication device by determining the paging channel from the serving base station onto which the SRLTE communication device is hashed. The processor may determine the paging channel onto which the SRLTE communication device is hashed by determining a channel identifier and/or Walsh code used for the current paging channel used by the current serving base station.

In determination block 418, the processor may determine whether there is a paging channel mismatch between the original paging channel and the current paging channel. For example, the processor may determine whether the Walsh codes of the channels are different.

In response to determining that the paging channels are the same (i.e., determination block 418="No"), the processor may send the MT page response message to the current serving base station on the original paging channel in block 420. The processor may then continue to listen for MT paging messages on the original paging channel in block 402.

In response to determining that there is a channel mismatch (i.e., determination block 418="Yes"), the processor may send the MT page response message to the current serving base station on the current paging channel in block 420. In this manner, the processor may send the MT page response to the current serving base station on a paging channel different from the paging channel on which the MT paging message was originally received, such as on a paging channel with different Walsh codes. The processor may then continue to listen for MT paging messages on the current paging channel in block 402.

Figure 5:
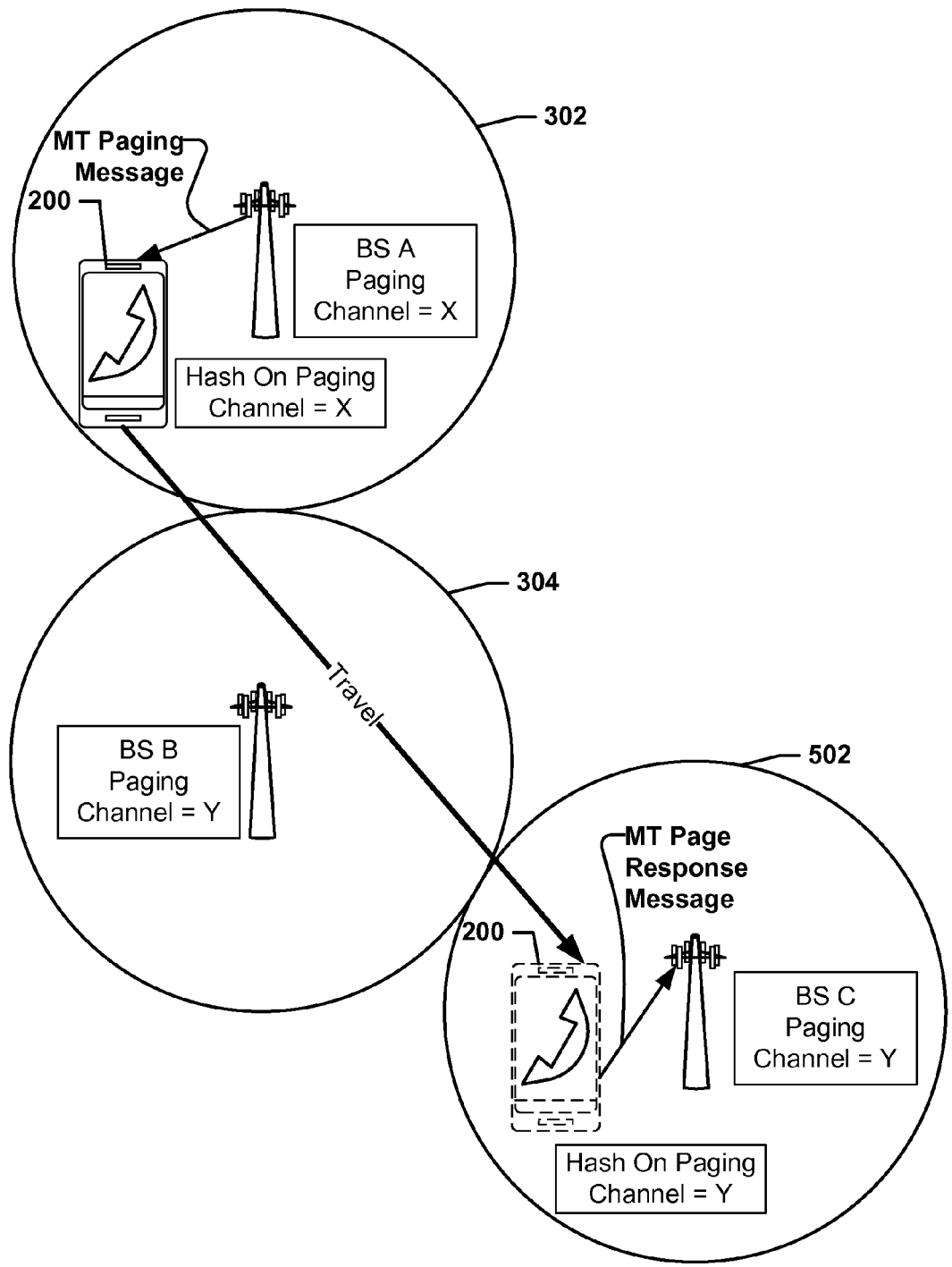
FIG. 5 is a block diagram of an MSC-Sub paging scenario according to another embodiment.

FIG. 5 is a block diagram of an MSC-Sub paging scenario according to various embodiments in which the SRLTE communication device 200 travels from the first cell 302 to a third cell 502 before responding to a MT paging message. With reference to FIGS. 1-5, at a first time, the SRLTE communication device 200 may be located within the first cell 302 managed by a base station A as described. In this example, rather than traveling to the second cell 304 that is a neighbor cell to cell 302 before responding to the MT paging message, the SRLTE communication device has traveled to a third cell 502 managed by a base station C that is not a neighbor cell to the first cell 302. The base station C may be configured to operate with a paging channel Y, which as described may be different from the paging channel X. Thus, during the delay in responding to the MT paging message, the SRLTE communication device 200 may select the paging channel Y from the base station C. For example, the SRLTE communication device 200 may determine the number of paging channels supported by the base station C (e.g., paging channel Y) from an overhead message, such as a System Parameters overhead message. The SRLTE communication device 200 may select the paging channel Y from the base station C by using a hash key based on the SRLTE communication device's 200 unique IMSI value in a hash algorithm, thereby hashing onto the paging channel Y with the base station C.

Because the third cell 502 is not a neighbor cell to the first cell 302, in the MSC-Sub paging scenario, the base station C may not generate a MT page context and may not expect a MT page response message from the SRLTE communication device 200. Thus, even though the SRLTE communication device 200 may send the MT page response message to the base station C, the base station C may not acknowledge the MT page response message or establish the MT call with the SRLTE communication device 200. The failure to establish the MT call after sending the MT page response message one or more times may cause the SRLTE communication device 200 to exceed the MAPE threshold. In various embodiments, in response to determining that the MAPE threshold is exceeded, the SRLTE communication device 200 may determine whether a base station handover occurred since the MT paging message was received. In response to determining that a base station handover did occur since the MT paging message was received, the SRLTE communication device 200 may stop sending the MT page response message to the base station C without adding the base station C or the paging channel Y to the temporary avoidance/forbidden list. In this manner, even though the MT call establishment failed between the base station C and the SRLTE communication device 200, the base station C and the paging channel Y may still be used by the SRLTE communication device 200.

Figure 6:
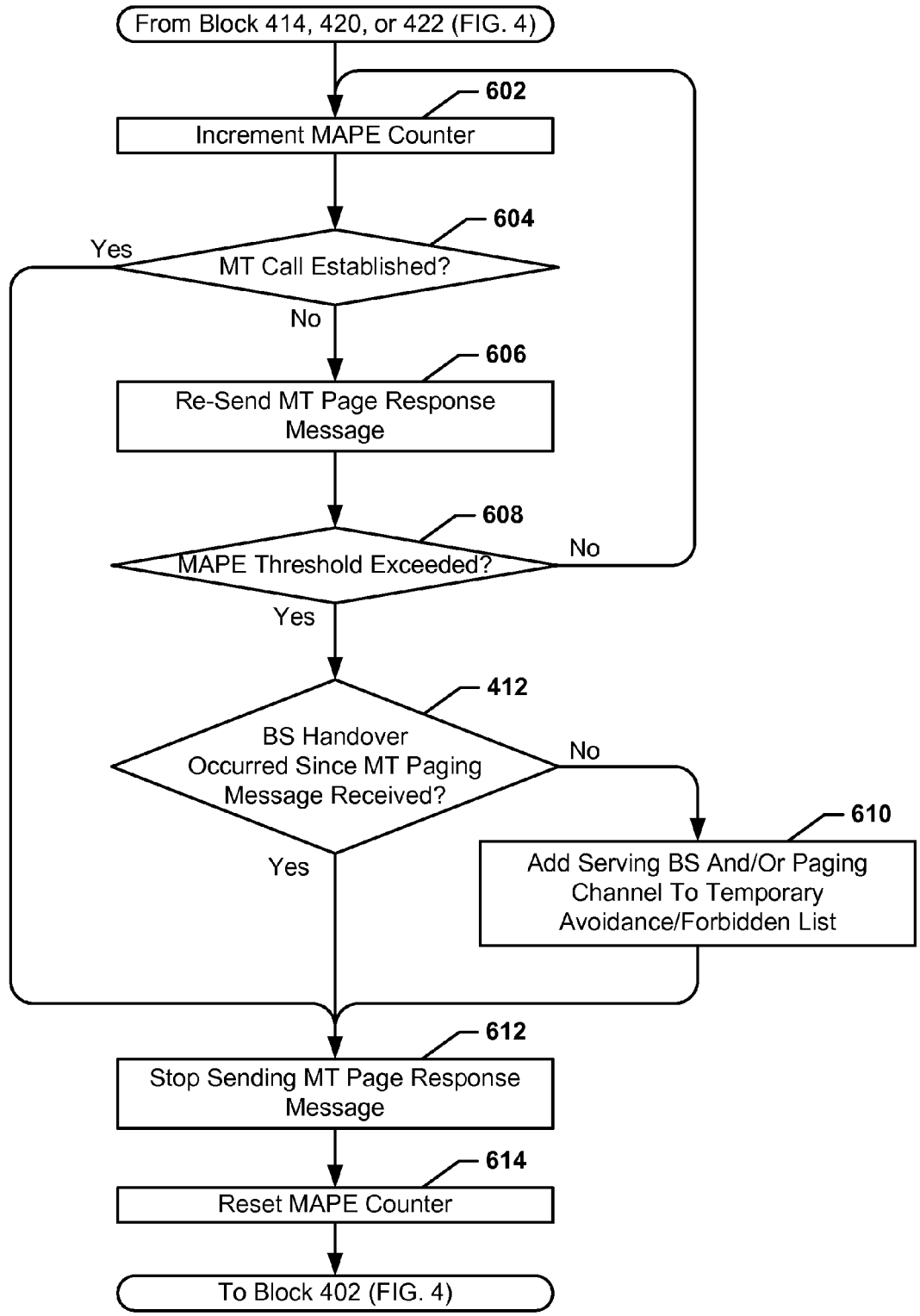
FIG. 6 is process flow diagram illustrating an embodiment method for stopping sending a MT page response message without adding a current paging channel and/or current serving base station to a temporary avoidance/forbidden list.

FIG. 6 illustrates a method according to various embodiments for stopping the sending of a MT page response message without adding a current paging channel and/or current serving base station to a temporary avoidance/forbidden list according to various embodiments. With reference to FIGS. 1-6, the method 600 may be implemented with a processor (e.g., the general processor 206, the baseband modem processor 216, a separate controller, and/or the like) on a SRLTE communication device (e.g., the SRLTE communication device 200).

In various embodiments, the operations of method 600 may be performed in conjunction with the operations of the method 400 as described, such as after the operations of blocks 414, 420, and 422 or before the operations of block 402 of the method 400. In response to sending an MT page response message in blocks 414, 420, or 422, the processor of the device may increment a MAPE counter in block 602. A MAPE counter may be a counter that tracks the number of sent MT page response messages that may be incremented after each transmission of a MT page response message by the SRLTE communication device.

In block 604, the processor may determine whether a MT call is established. For example, the processor may determine whether a base station acknowledged the sent MT page response message and/or a traffic channel with the base station is established for a MT call. In response to determining that a MT call is established (i.e., determination block 604="Yes"), the processor may stop sending the MT page response message in block 612 and reset the MAPE counter in block 614. The processor may then continue to listen for MT paging messages in block 402 of the method 400.

In response to determining that a MT call is not established (i.e., determination block 604="No"), the processor may resend the MT page response message in block 606. The processor may resend the MT page response message on the same paging channel and to the same base station as the MT page response message was sent in blocks 414, 420, or 422 of the method 400, respectively. In this manner, the processor may reattempt to establish the MT call.

In determination block 608, the processor may determine whether a MAPE threshold is exceeded. The MAPE threshold may be a set maximum threshold for sending MT page response messages. The processor may compare a value of the MAPE counter to the MAPE threshold to determine whether the number of sent MT page response messages exceeds the MAPE threshold. In response to determining that the MAPE threshold is not exceeded (i.e., determination block 608="No"), the processor may increment the MAPE counter in block 602.

In response to determining that the MAPE threshold is exceeded (i.e., determination block 608="Yes"), the processor may determine whether a base station handover occurred since the MT paging message was received in block 412 of the method 400. Conducting a base station handover since the MT paging message was received may be the reason that the MT call was not established when the serving base station did not have a MT page context established because the serving base station was not a neighbor cell when the MT page message was sent. Thus, when a base station handover has occurred since the MT paging message was received, the failure to establish the MT call may be unrelated to the quality of service with the serving base station. In contrast, when a base station handover has not occurred, the failure to establish the MT call is more likely due to low quality of service with the serving base station.

In response to determining that a base station handover has not occurred (i.e., determination block 608="No"), the processor may add the serving base station and/or paging channel to a temporary avoidance/forbidden list in block 610. In this manner, the processor may "blacklist" base stations and/or paging channels likely experiencing a low level of quality of service. Upon adding the serving base station and/or paging channel to a temporary avoidance/forbidden list, the processor may stop sending the MT page response message in block 612 and reset the MAPE counter in block 614. The processor may then continue to listen for MT paging messages in block 402 of the method 400.

In response to determining that a base station handover has occurred (i.e., determination block 608="Yes"), the processor may stop sending the MT page response message in block 612 without adding the serving base station and/or paging channel to a temporary avoidance/forbidden list. The processor may reset the MAPE counter in block 614. The processor may then continue to listen for MT paging messages in block 402 of the method 400.

Figure 7:
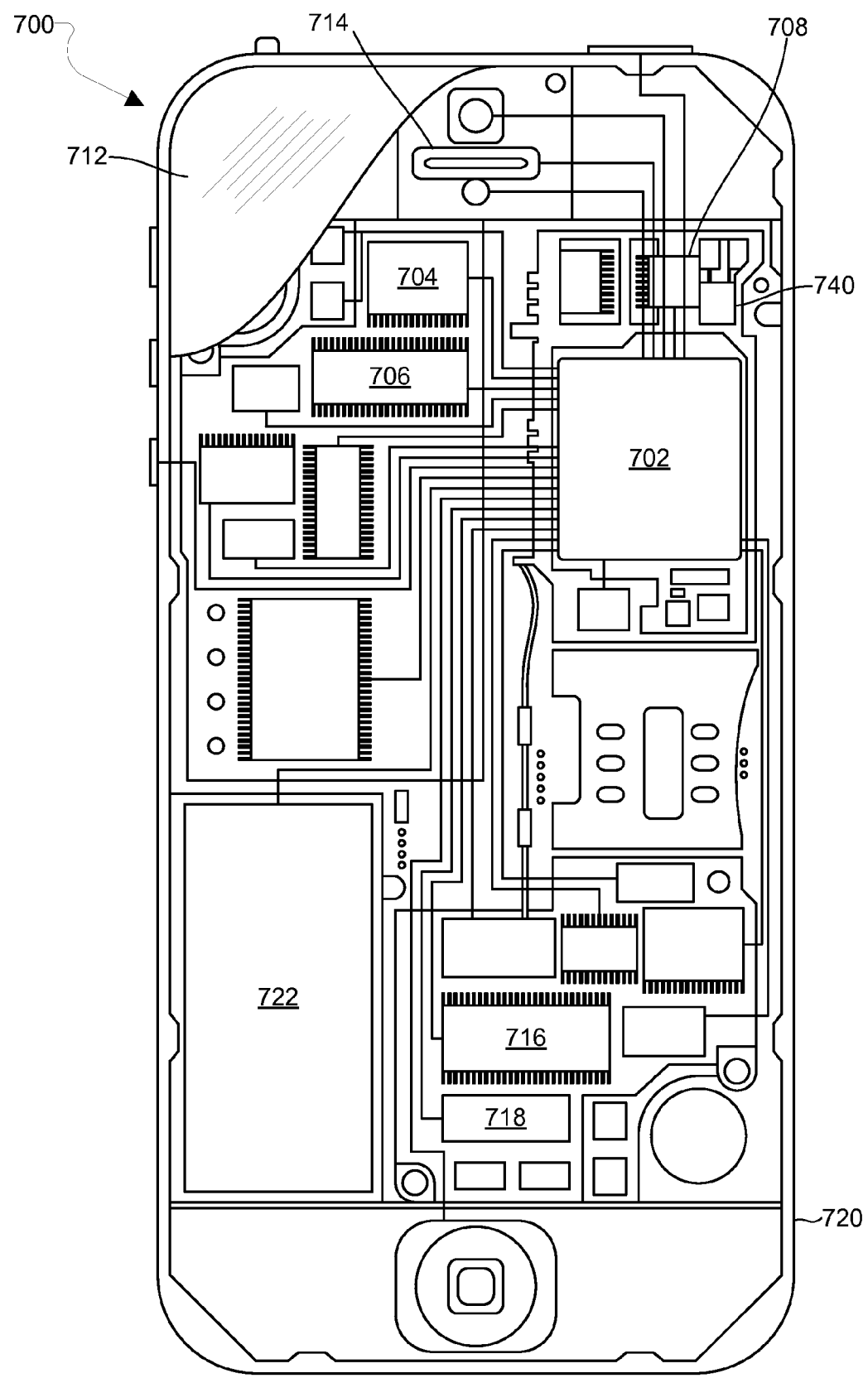
FIG. 7 is a component block diagram of a communication device suitable for implementing some embodiment methods.

Various embodiments may be implemented in any of a variety of communication devices, an example on which (e.g., SRLTE communication device 700) is illustrated in FIG. 7. With reference to FIGS. 1-7, the SRLTE communication device 700 may be similar to the SRLTE communication devices 110, 120, 200 and may implement the methods 400 and/or 600 as described.

The SRLTE communication device 700 may include a processor 702 coupled to a touchscreen controller 704 and an internal memory 706. The processor 702 may be one or more multi-core integrated circuits designated for general or specific processing tasks. The internal memory 706 may be volatile or non-volatile memory, and may also be secure and/or encrypted memory, or unsecure and/or unencrypted memory, or any combination thereof. The touchscreen controller 704 and the processor 702 may also be coupled to a touchscreen panel 712, such as a resistive-sensing touchscreen, capacitive-sensing touchscreen, infrared sensing touchscreen, etc. Additionally, the display of the SRLTE communication device 700 need not have touch screen capability.

The SRLTE communication device 700 may have one or more cellular network transceivers 708, 716 coupled to the processor 702 and to two or more antennae 710, 711 and configured for sending and receiving cellular communications. The transceivers 708, 716 and the antennae 710, 711 may be used with the above-mentioned circuitry to implement the various embodiment methods. The SRLTE communication device 700 may include one or more SIM cards (e.g., SIM 713) coupled to the transceivers 708, 716 and/or the processor 702 and configured as described. The SRLTE communication device 700 may include a cellular network wireless modem chip 717 that enables communication via a cellular network and is coupled to the processor 702.

The SRLTE communication device 700 may also include speakers 714 for providing audio outputs. The SRLTE communication device 700 may also include a housing 720, constructed of a plastic, metal, or a combination of materials, for containing all or some of the components discussed herein. The SRLTE communication device 700 may include a power source 722 coupled to the processor 702, such as a disposable or rechargeable battery. The rechargeable battery may also be coupled to the peripheral device connection port to receive a charging current from a source external to the SRLTE communication device 700. The SRLTE communication device 700 may also include a physical button 724 for receiving user inputs. The SRLTE communication device 700 may also include a power button 726 for turning the SRLTE communication device 700 on and off.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the various embodiments. Various modifications to these embodiments will be readily apparent to those skilled in the art, and the generic principles defined herein may be applied to some embodiments without departing from the spirit or scope of the various embodiments. Thus, the various embodiments are not intended to be limited to the examples shown herein but are to be accorded the widest scope consistent with the following claims and the principles and novel features disclosed herein.

What is claimed is:

1. A method for managing Mobile Termination (MT) paging messages in a single radio long term evolution (SRLTE) communication device, comprising:
   receiving an MT paging message;
   determining whether a base station handover has occurred since the MT paging message was received;
   determining a current paging channel that the SRLTE communication device selected from a current serving base station in response to determining that the base station handover has occurred since the MT paging message was received;
   determining whether there is a mismatch between the current paging channel and an original paging channel that the SRLTE communication device had selected from an original serving base station when the MT paging message was received; and
   sending a MT page response message to the current serving base station on the current paging channel in response to determining the mismatch between the current paging channel and the original paging channel.

2. The method of claim 1, wherein determining whether there is a mismatch between the current paging channel and an original paging channel that the SRLTE communication device had selected from an original serving base station when the MT paging message was received comprises:
   determining whether a first Walsh code of the current paging channel and a second Walsh code of the original paging channel are the same when the current paging channel and the original paging channel have a common carrier frequency.

3. The method of claim 1, further comprising sending the MT page response message to the original serving base station on the original paging channel in response to determining that the base station handover has not occurred since the MT paging message was received.

4. The method of claim 1, further comprising sending the MT page response message to the current serving base station on the original paging channel in response to determining that there is not a mismatch between the current paging channel and the original paging channel.

5. The method of claim 1, further comprising:
   reconfiguring a single radio frequency (RF) resource to respond to the MT paging message; and
   determining the current serving base station after reconfiguring the single RF resource.

6. The method of claim 1, further comprising determining the original paging channel that the SRLTE communication device had selected from the original serving base station when the MT paging message was received.

7. The method of claim 1, further comprising:
   determining whether a Max Access Probe Exit (MAPE) threshold is exceeded after sending the MT page response message on the current paging channel; and
   stopping sending of the MT page response message on the current paging channel without adding the current serving base station or the current paging channel to a temporary avoidance/forbidden list in response to determining that the MAPE threshold is exceeded.

8. The method of claim 7, wherein stopping sending of the MT page response message on the current paging channel without adding the current serving base station or the current paging channel to the temporary avoidance/forbidden list in response to determining that the MAPE threshold is exceeded comprises:
   stopping sending of the MT page response message on the current paging channel without adding the current serving base station or the current paging channel to the temporary avoidance/forbidden list in response to determining that the MAPE threshold is exceeded and that the base station handover occurred since the MT paging message was received.

9. The method of claim 8, further comprising:
   adding the current serving base station or the current paging channel to the temporary avoidance/forbidden list in response to determining that the MAPE threshold is exceeded and that the base station handover has not occurred since the MT paging message was received; and
   stopping sending of the MT page response message on the current paging channel in response to adding the current serving base station or the current paging channel to the temporary avoidance/forbidden list.

10. The method of claim 7, further comprising:
determining whether a MT call is established;
stopping sending of the MT page response message on the current paging channel in response to determining that the MT call is established; and
re-sending the MT page response message to the current serving base station on the current paging channel in response to determining that the MT call is not established.

11. A communication device, comprising:
a single radio frequency (RF) resource; and
a processor coupled to the single RF resource and configured with processor-executable instructions to:
receive an Mobile Termination (MT) paging message;
determine whether a base station handover has occurred since the MT paging message was received;
determine a current paging channel that the communication device selected from a current serving base station in response to determining that the base station handover has occurred since the MT paging message was received;
determine whether there is a mismatch between the current paging channel and an original paging channel that the communication device had selected from an original serving base station when the MT paging message was received; and
send a MT page response message to the current serving base station on the current paging channel in response to determining the mismatch between the current paging channel and the original paging channel.

12. The communication device of claim 11, wherein the processor is further configured with processor-executable instructions to determine whether there is the mismatch between the current paging channel and the original paging channel that the communication device had selected from the original serving base station when the MT paging message by determining whether a first Walsh code of the current paging channel and a second Walsh code of the original paging channel are the same when the current paging channel and the original paging channel have a common carrier frequency.

13. The communication device of claim 11, wherein the processor is further configured with processor-executable instructions to send the MT page response message to the original serving base station on the original paging channel in response to determining that the base station handover has not occurred since the MT paging message was received.

14. The communication device of claim 11, wherein the processor is further configured with processor-executable instructions to send the MT page response message to the current serving base station on the original paging channel in response to determining that there is not a mismatch between the current paging channel and the original paging channel.

15. The communication device of claim 11, wherein the processor is further configured with processor-executable instructions to:
reconfigure the single RF resource to respond to the MT paging message; and
determine the current serving base station after reconfiguring the single RF resource.

16. The communication device of claim 11, wherein the processor is further configured with processor-executable instructions to determine the original paging channel that the communication device had selected from the original serving base station when the MT paging message was received.

17. The communication device of claim 11, wherein the processor is further configured with processor-executable instructions to:
determine whether a Max Access Probe Exit (MAPE) threshold is exceeded after sending the MT page response message on the current paging channel; and
stop sending of the MT page response message on the current paging channel without adding the current serving base station or current paging channel to a temporary avoidance/forbidden list in response to determining that the MAPE threshold is exceeded.

18. The communication device of claim 17, wherein the processor is further configured with processor-executable instructions to stop sending of the MT page response message on the current paging channel without adding the current serving base station or current paging channel to the temporary avoidance/forbidden list in response to determining that the MAPE threshold is exceeded by:
stopping sending of the MT page response message on the current paging channel without adding the current serving base station or current paging channel to the temporary avoidance/forbidden list in response to determining that the MAPE threshold is exceeded and that the base station handover occurred since the MT paging message was received.

19. The communication device of claim 18, wherein the processor is further configured with processor-executable instructions to:
add the current serving base station or current paging channel to the temporary avoidance/forbidden list in response to determining that the MAPE threshold is exceeded and that the base station handover has not occurred since the MT paging message was received; and
stop sending of the MT page response message on the current paging channel in response to adding the current serving base station or current paging channel to the temporary avoidance/forbidden list.

20. The communication device of claim 17, wherein the processor is further configured with processor-executable instructions to:
determine whether a MT call is established;
stop sending of the MT page response message on the current paging channel in response to determining that the MT call is established; and
re-send the MT page response message to the current serving base station on the current paging channel in response to determining that the MT call is not established.

21. A non-transitory processor-readable storage medium having stored thereon processor-executable instructions configured to cause a processor of a single radio long term evolution (SRLTE) communication device to perform operations to manage Mobile Termination (MT) paging messages, comprising:
receiving an MT paging message;
determining whether a base station handover has occurred since the MT paging message was received;
determining a current paging channel that the SRLTE communication device selected from a current serving base station in response to determining that the base station handover has occurred since the MT paging message was received;
determining whether there is a mismatch between the current paging channel and an original paging channel that the SRLTE communication device had selected from an original serving base station when the MT paging message was received; and sending a MT page response message to the current serving base station on the current paging channel in response to determining the mismatch between the current paging channel and the original paging channel.

22. A single radio long term evolution (SRLTE) communication device, comprising:

means for receiving a Mobile Termination (MT) paging message;

means for determining whether a base station handover has occurred since the MT paging message was received;

means for determining a current paging channel that the SRLTE communication device selected from a current serving base station in response to determining that the base station handover has occurred since the MT paging message was received;

means for determining whether there is a mismatch between the current paging channel and an original paging channel that the SRLTE communication device had selected from an original serving base station when the MT paging message was received; and means for sending a MT page response message to the current serving base station on the current paging channel in response to determining the mismatch between the current paging channel and the original paging channel.

* * * * *